Sept. 26, 1961                E. C. MERSEREAU                3,001,612
SLACK ADJUSTER FOR POWER TRANSMISSION SYSTEMS
Filed Oct. 14, 1959                                    3 Sheets-Sheet 3
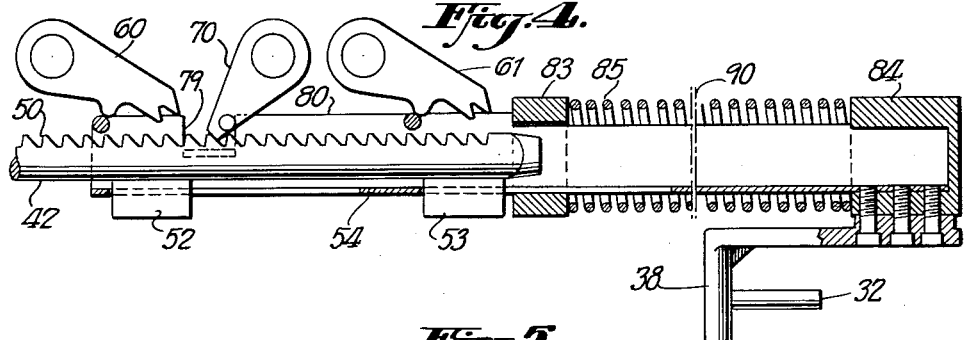
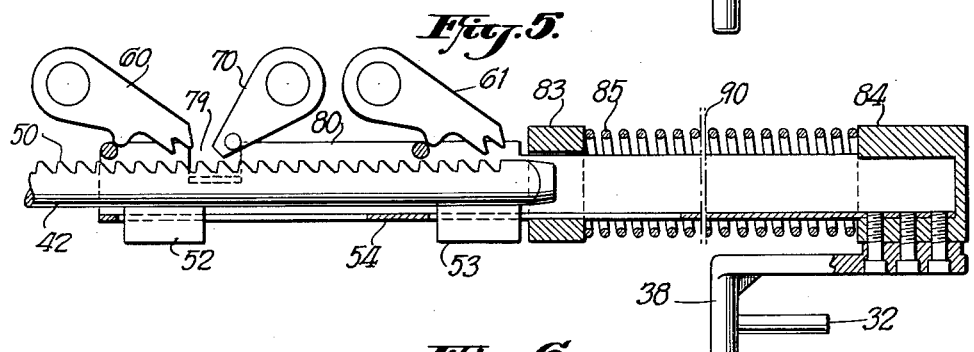
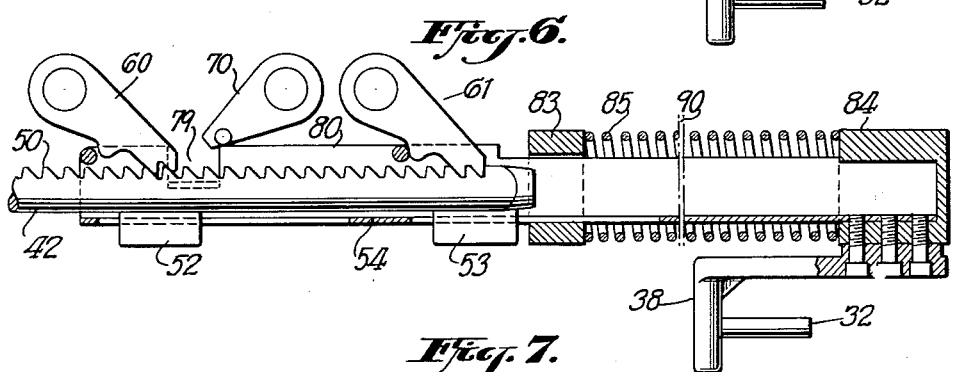
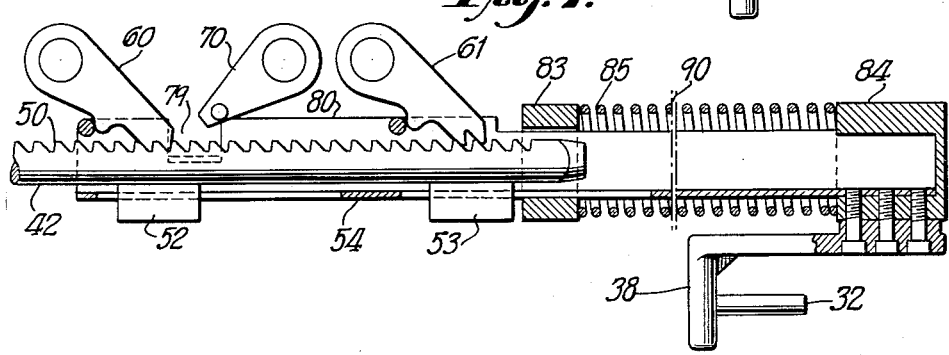
INVENTOR.
EVERARD C. MERSEREAU.
BY
*Ward, Neal, Haselton, Orme & McElhannon*
ATTORNEYS.

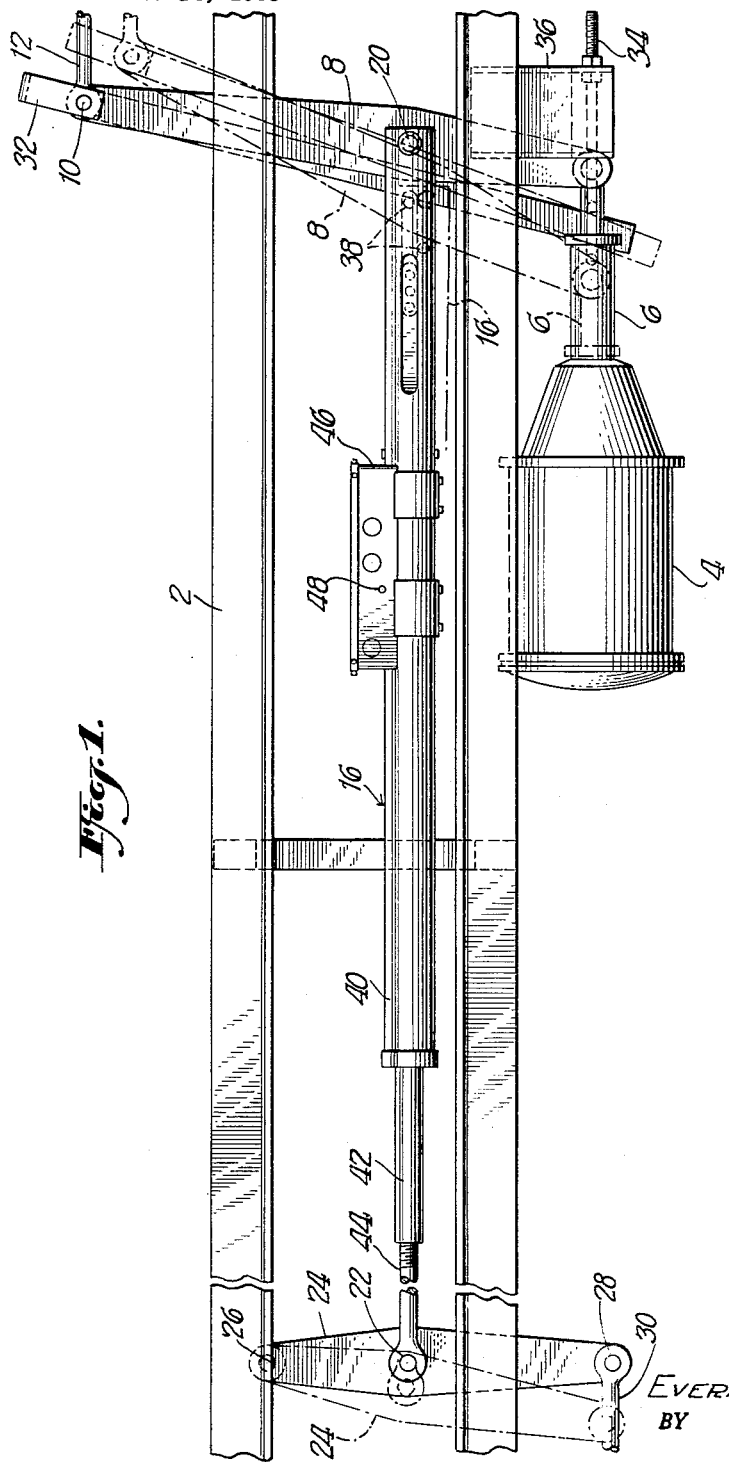

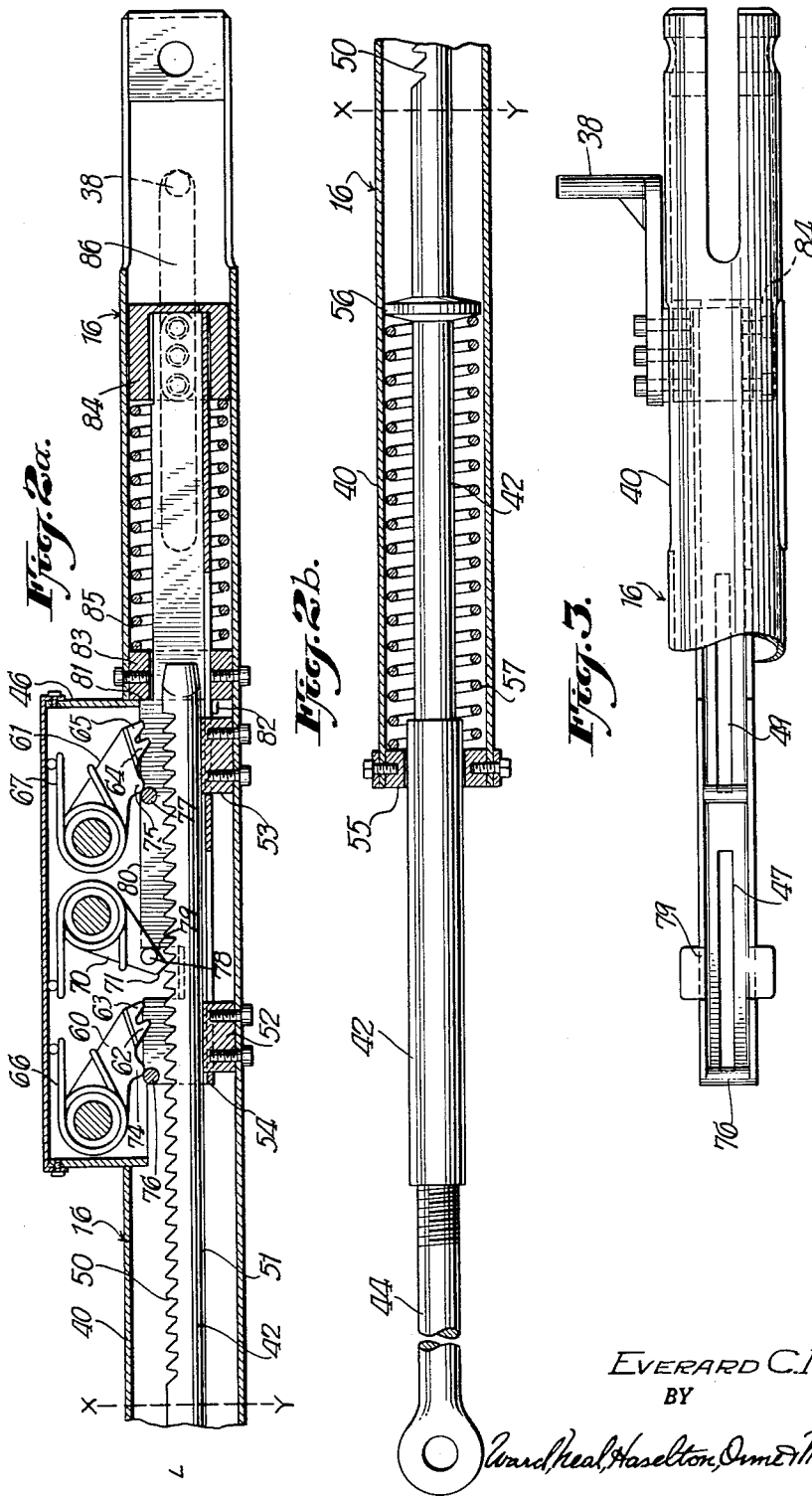

United States Patent Office 3,001,612
Patented Sept. 26, 1961

3,001,612
SLACK ADJUSTER FOR POWER TRANSMISSION SYSTEMS
Everard C. Mersereau, Westfield, N.J., assignor, by mesne assignments, to Robert M. Holloway and Robert L. Ludington, both of Michigan City, Ind.
Filed Oct. 14, 1959, Ser. No. 846,431
9 Claims. (Cl. 188—196)

The invention relates to power transmission systems, and particularly to an arrangement useful in controlling power source movement via slack elimination in such systems, and has particular utility as applied to brake riggings for railway rolling stock or the like.

Known types of railway rolling stock are provided with brake shoes operated by a fluid actuated cylinder and piston arrangement through brake rigging including live levers, dead or fulcrum levers and connecting rods..

Those familiar with this art will further understand that the reservoir of air or fluid under pressure available in railway rolling stock for actuating the cylinder and piston arrangement is of necessity limited. Further, the rigging generally is designed to provide an optimum braking force or pressure at the wheel only under a determined movement of the push-rod. Needless to say, it is desirable to provide the optimum braking pressure under all conditions of rolling stock operation. Any departure from this optimum braking position reduces braking efficiency in that either excessive braking pressure results, or reduced braking pressure results. The key, therefore, in obtaining substantially optimum braking efficiency in railway rolling stock, is providing an arrangement that will effectively maintain primary power source movement, that is, push-rod movement, at or near the determined design distance or length. It is the recommendation of the railroad operating companies at the present time that the end of the brake piston rod be within from 7 to 9 inches from the corresponding end of the brake cylinder when the brakes are fully applied. It will be apparent, therefore, that the braking position of the push-rod must be maintained within relatively close limits.

Excessively long piston travel usually results from excessive slack in the brake rigging due to brake shoe wear, wheel wear, rigging wear or deformation, etc. Piston travel shorter than the desired amount usually results from the replacement of worn parts without proper readjustment of the rigging.

Apparatus including a slack adjusting device which will effectively maintain a brake cylinder piston and push-rod movement at substantially the optimum design distance, is disclosed in the co-pending application Serial No. 731,244 filed April 28, 1958 by Robert M. Holloway et al. and entitled "An Arrangement to Control Power Source Movement via Slack Elimination in a Brake Rigging or the Like." My invention relates primarily to improvements in the slack adjusting device employed as part of the apparatus described in said co-pending application.

As pointed out above, the recommendations of the railroad operating companies and design considerations make it highly desirable to control the position of the brake piston rod in its full braking position within relatively close limits. Furthermore, in order to be of wide application, the slack adjusting apparatus should be adapted for installation in railway cars and other vehicles already in use. These considerations involve restrictive space and size limitations as well as limitations on the size of the increments of slack adjustment which should be obtainable with the slack adjusting device.

For example, on some existing structures where the slack adjusting device must be installed, the diameter of the adjusting device cannot exceed approximately 3½" to 4" in width and depth. On the other hand, the forces involved in braking may exceed 25,000 pounds and with the constructions shown in the aforesaid co-pending application, it is difficult to meet the aforesaid space requirements and still provide a structure which has sufficient strength to withstand the braking forces.

Such braking forces may also subject elements of the slack adjusting device to lateral or side-wise forces of relatively adjusting device to lateral or side-wise forces of relatively large magnitude, for example, in excess of 30,000 pounds. Thus, in the slack adjusting device the toothed member or rack may, at the point at which it engages the detent or pawl, be subjected to lateral forces of large magnitude, and therefore, in order to support such toothed member or rack and to increase the ease with which it may be moved, it is desirable to support such member or rack on the side thereof opposite from the detent or pawl by relatively smooth supports or bars. With such an arrangement, it is difficult to provide teeth on both sides of the member or rack without lengthening the slack adjusting device. In addition, a member or rack having teeth on both sides thereof is difficult and more costly to manufacture.

In the slack adjusting device of said co-pending application, it is possible to obtain the desired adjusting increments by the pair of toothed members or racks, or by a rack having teeth on opposite sides because each set of teeth may have a different spacing than the other set of teeth. Thus, the teeth of the rack which engages the locking detent or pawl may be relatively fine because the forces to which such teeth are subjected are produced only by the slack adjusting spring which is merely powerful enough to take up the slack of the rigging. In other words, the teeth of this rack are not subjected to full braking forces. The other set of teeth which cooperates with the load detent or pawl may be made relatively large in size without increasing the size of the adjustment increment, and therefore, they may be made of a size adequate to withstand the braking forces.

However, when the toothed member or rack has only a single set of teeth it is not possible as a practical matter to make the teeth fine enough to obtain the desired adjustment increments and still obtain the desired tooth strength.

Because moving parts are involved, and for safety reasons, it is desirable that the slack adjusting mechanism be substantially completely enclosed by a housing. In order to keep size of the housing within the desired limits, certain modifications of the apparatus described in the aforesaid co-pending application must also be made.

The slack adjusting device of my invention satisfies the requirements set forth above and provides solutions to problems set forth above. In the preferred embodiment of the invention, the movable mechanisms of the slack adjusting device are enclosed in a tubular housing. The rack member has teeth on a single side thereof which teeth may be of a size sufficient to provide the desired strength, and by the use of at least two load pawls, the small adjustment increments may be obtained, if desired; in spite of the use of a single set of teeth and the use of teeth of relatively large size. Furthermore, because teeth are provided on only one side of the rack, the opposite side of the rack may be relatively smooth and flat, and therefore, may be supported at the critical points by smooth bearings. In addition, because of the fact that the detent or pawl mechanisms are located only on one side of the rack, the external size of the housing may be maintained within the desired limits.

It is one object of the invention to provide a slack adjustment mechanism strong enough to withstand high braking forces and yet be small in width and depth.

It is a further object of the invention to provide a slack adjusting mechanism which is simple and relatively inexpensive to manufacture and which is reliable and safe to operate.

It is a further object of the invention to provide a substantial totally enclosed slack adjusting device which is relatively small in size and which will permit slack adjustment in relatively small increments.

Other objects and advantages of the invention will be apparent to those skilled in the art from the following detailed description of preferred embodiments thereof, which description should be considered in conjunction with the accompanying drawings in which:

FIG. 1 is a schematic, plan view illustrating the slack adjusting device of the invention in association with a typical brake rigging arrangement;

FIGS. 2a and 2b are enlarged plan views partly in cross-section of the slack adjusting device of the invention, FIGS. 2a and 2b showing different portions of the slack adjusting device;

FIG. 3 is a fragmentary, side elevation view of a portion of the device shown in FIGS. 2a and 2b; and FIGS. 4–7 are enlarged, fragmentary, plan views of a portion of the slack adjusting device illustrated in the previous figures, showing the positions of the members or parts illustrated in different stages of operation of the brakes.

The preferred slack adjusting device is illustrated in FIG. 1 in connection with a schematically shown, typical brake rigging currently employed in railway rolling stock. The numeral 2 designates a center sill of a typical freight car truck which has mounted thereon an air cylinder 4, said air cylinder having a connection (not shown) to a reservoir of fluid under pressure, such as air. A piston rod 6 is operatively associated with a piston (not shown) which is mounted internally of the cylinder 4, said rod 6 extending outwardly from the cylinder and at its extremity is pivotally connected to one end of a live lever 8, said live lever 8 extending substantially transversely of the car and center sill. The opposite end of the live lever 8 is pivotally connected as at 10 to one end of a pull-rod 12, said pull-rod 12 being connected to a well known type of linkage, which operates brake shoes mounted in braking relation to the periphery of the wheels on one truck of the car. The preferred slack adjusting device 16 is pivotally connected at one end, as at 20, to an intermediate portion of the live lever 8, said device 16 having its opposite end pivotally connected, as at 22, to an intermediate portion of the dead fulcrum lever 24, said lever 24 being pivoted at one end thereof, as at 26, in fixed or determined relation to the car and consequently the center sill 2. The opposite end of the lever 24 is pivotally connected, as at 28, to another pull-rod 30, which in turn is connected to a conventional linkage arrangement which operates brake shoes arranged in braking relation to the wheels of a second truck of the freight car.

As described in the aforesaid co-pending application, an activator lever 32 is pivotally connected at 10 to one end of the live lever 8. The opposite end of the activator lever 32 extends through an opening in an eye bolt 34, which opening loosely receives the end of the activator lever 32 so that it is free to move a small amount in the longitudinal direction of the railway car and so that it is free to move transversely of said car. The eye bolt 34 is adjustably mounted on a bracket 36 secured to the sill 2 of the railway car. The positions of the live lever 8, the activator lever 32, the piston rod 6, the slack adjusting device 16 and the fulcrum lever 24, when the brakes are fully applied, are shown in solid lines in FIG. 1 whereas the positions of these elements when the brakes are fully released are shown in plantom lines in FIG. 1.

An activating arm 38 extends downwardly from the slack adjusting device 16, away from the viewer, as viewed in FIG. 1, and when the brakes are applied, the activator lever 32 engages the arm 38 and causes operation of the slack adjusting device 16 in a manner hereinafter described. On the other hand, when the brakes are released the activating arm 38 and the activator lever 32 separate as illustrated in FIG. 1. When the brakes are applied, movement of the activating arm 38, as a result of its engagement with the activator lever 32 and movement thereof, operates the mechanisms of the slack adjusting device 16 in such a manner as to reduce the over-all length of the adjusting device 16 when there is slack in the brake rigging. Thus, when there is slack in the brake rigging the distance between the pivot point 22 and the pivot point 20 decreases during application of the brakes.

Preferably, the parts of the slack adjusting device 16 are made of steel, but it is to be understood that they may also be made of other materials capable of withstanding the forces applied thereto. The slack adjusting device 16 comprises a tubular housing 40 from one end of which extends a rack bar 42 into which is threaded a rod 44, the rod 44 being pivotally connected to the lever 24 at 22 as aforesaid. The opposite end of the housing 40 is pivotally secured at 20 to the live lever 8. The housing 40 has a projecting portion 46 at one side thereof which projecting portion 46 houses the load and locking pawls hereinafter described. Prior to installation the locking pawl may be locked in locking position by means of a pin 48 inserted through the projecting portion 46.

The slack adjusting device 16 is illustrated in greater detail in FIGS. 2a, 2b and 3. The rack bar 42 (FIG. 2a) has rack teeth 50 at one side thereof, such rack teeth 50 facing toward the projecting portion of the housing 40, and at its opposite side 51, the rack 42 is relatively flat and smooth. The rack bar 42 is slidably mounted in the housing 40 and is slidable axially of the housing 40, that is, from right to left or vice versa as viewed in FIG. 2a. The side 51 of the rack bar 42 bears against two bearings or bearing blocks 52 and 53 supported on and secured to the housing 40. The bearings 52 and 53 extend through slots 47 and 49 in the actuator 54 which is U-shaped in cross-section.

Mounted internally of the housing 40 on one end thereof is a combined bearing and stop 55 (FIG. 2b). The bearing and stop 55 is secured to the housing 40 and the rack bar 42 passes through an opening in the bearing and stop 55 and slidably enages the walls of such opening. The rack bar 42 is provided with a collar or annular projection 56 which moves with the rack bar 42. A coil spring 57 is mounted within the housing 40 intermediate the collar 56. and the stop 55 and urges the rack bar 42 to the right with respect to the housing 40 as viewed in FIGS. 2a and 2b.

A pair of load pawls 60 and 61 are pivotally or rotatably mounted on the housing 40 within the projecting portion 46. Each of the load pawls 60 and 61 have portions in the form of teeth 62–65 which are engageable with the rack teeth 50 of the rack bar 42, and the pawls 60 and 61 are urged toward the rack teeth 50 by springs 66 and 67. For purposes hereinafter described, the teeth 62 and 64, and the teeth 63 and 65 on the load pawls 60 and 61 are spaced apart, in corresponding positions of the pawls 60 and 61, a fractional multiple of the spacing between the rack teeth 50.

The locking pawl 70 (FIG. 2a) is pivotally or rotatably mounted on the housing 40 within the projecting portion 46 and preferably is mounted intermediate the load pawls 60 and 61, although it will be understood by those skilled in the art that it may be located on either side of the load pawls 60 and 61. The locking pawl 70 has a portion 71 which is engageable with the rack teeth 50. It will be noted that the portion 71 engages the rack teeth 50 on sides thereof opposite from the sides with which the rack teeth engaging portions 62–65 of the load pawls 60 and 61 are engageable so that when the locking pawl 70 is in engagement with one of the rack teeth 50, the rack bar 42 is prevented from moving to the right as viewed in FIGS. 2a and 2b whereas when the load pawls 60 and 61 are in engagement with the rack teeth 50, the rack bar 42 is prevented from moving to the left wtih respect to the housing 40 as viewed in FIGS. 2a and 2b.

The load pawls 60 and 61 are provided with projecting portions 74 and 75 which are engageable with portions of the actuator 54, such as the pins 76 and 77. Similarly, the locking pawl 70 has at least one projecting portion or pin 78 which may be received in an aperture or cut-out 78 in the actuator 54. When the actuator 54 is moved axially of the housing 40 and to the left, the projection 78 rides on the upper surface 80 of the actuator 54.

The actuator 54 is slidably mounted in the housing 40 and is slidable from right to left from the position shown in FIG. 2a. The actuator 54 also rides or slides on the bearings or bearing blocks 52 and 53 and has a pair of projecting portions 81 and 82 which are engageable with a stop and bearing 83 secured to the housing 40. The actuator 54 is provided with a projecting portion or collar 84 which bears against the interior of the wall of the housing 40, the portion or collar 84 being movable with the actuator 54. A coil spring 85 is mounted within the housing 40 and acts between the stop 83 and the portion or collar 84 to urge the actuator 54 to the right as viewed in FIG. 2a. The activating arm 38 extends through a slot 86 in the housing 40 and is secured to the portion or collar 84. If desired, the housing 40 may be provided with a plurality of spaced slots 86 around the periphery of the housing 40, so that the arm 38 may be mounted in different positions to accommodate different installation requirements.

When the activating arm 38 is pushed to the left as viewed in FIG. 2a, the actuator 54 moves to the left first lifting the locking pawl 70 out of engagement with the rack teeth 50 and then permitting the load pawls 60 and 61 to engage the rack teeth 50. Preferably, during a portion of the movement of the actuator 54, all of the pawls 60, 61, and 70 are out of engagement with the rack teeth 50 to permit movement of the rack bar 42 without contact with the pawls. Accordingly, in the position of the actuator 54 shown in FIG. 2a, the locking pawl 70 is in engagement with the teeth 50 and the load pawls 60 and 61 are held out of engagement with the teeth 50, in a second position of the actuator 54 displaced to the left from the position shown on FIG. 2a, the locking pawl is out of engagement with the rack teeth 50 and the load pawls 60 and 61 engage the rack teeth 50 and preferably, in intermediate position, all of the pawls 60, 61 and 70 are out of engagement with the rack teeth 50. However, in some cases, it may not be necessary to have all pawls out of engagement with the teeth 50 at the same time. It will be noted from an examination of the configuration of the actuator 54 and the disposition and configuration of the pawls 60, 61 and 70 that the actuator 54 may move to the left a distance greater than that necessary to actuate the pawls in the desired manner. Provision for such over travel of the actuator 54 is desirable in that due to malfunctioning of the equipment, the activator lever 32 may push the activating arm 38 a distance greater than that necessary for the desired operation of the parts.

FIGS. 4-7 illustrate the positions of the load and locking pawls and the actuator 54 during various stages of the application of the brakes. In these figures, for purposes of illustration, the portion of the slack adjusting device to the right of the dividing line 90 is shown in a position rotated 90° about the axis of the housing 40 with respect to the normal position thereof in relation to the portion of the device 16 to the left of the dividing line 90.

FIG. 4 illustrates the positions of the parts of the adjusting device when the brakes are released, FIG. 5 illustrates the positions of the parts of the adjusting device when the brakes have been partly applied, FIG. 6 illustrates the positions of the parts of the adjusting device when the brakes have been set and the load pawl 61 has engaged the rack teeth 50 and FIG. 7 illustrates the positions of the parts of the adjusting device when the brakes have been set but the load pawl 60 instead of the load pawl 61 has engaged the rack teeth 50.

When the slack adjusting device 16 is initially installed, the spring 57 is partly compressed and the locking pawl 70 is in engagement with the rack teeth 50 to maintain the spring 57 in its partly compressed state. The spring 57 applies sufficient force to the collar 56 on the rack bar 42 to take up any slack on the brake rigging when the locking pawl 70 is disengaged from the teeth 50. However, the spring 57 is not strong enough to cause the brake shoes to exert any appreciable pressure on the wheels of the railway car when the locking pawl 70 is disengaged from the teeth 50. The spring 85 is merely strong enough to return the actuator 54 to the position shown in FIGS. 2a and 4.

When the brakes are released, that is, when the piston rod 6 (FIG. 1) is in its retracted position shown by phantom lines in FIG. 1, the pawls 60, 61 and 70, the actuator 54 and the activating arm 38 are in the relative positions illustrated in FIG. 4. As air under pressure is supplied to the air cylinder 4, the piston rod 6 moves to the right as viewed in FIG. 1 and at some point in the movement the activating arm 38 engages the activator lever 32. As the brakes are further applied, and hence as the piston rod 6 moves further to the right as viewed in FIG. 1, the activating arm 38 is moved to the left with respect to the housing 40, thereby compressing the spring 85 and causing the actuator 54 to move to the left with respect to the housing 40. At an intermediate stage in the application of the brakes, the actuator 54 will be in the position shown in FIG. 5 and the pawls 60, 61 and 70 will be out of engagement with the rack teeth 50. At this time, namely, when all of the pawls are disengaged from the rack 50, if there is slack in the brake riggings, the rack bar 42 will move to the right with respect to the housing 40 under the pressure of the spring 57 thereby shortening the overall length of the slack adjusting device and taking up the slack in the rigging.

When the brakes are further applied and hence when the piston rod 6 moves further to the right the actuator 54 assumes the position shown in FIG. 6 or FIG. 7 because of the pressure exerted against the activating arm 38 by the activator lever 32. In this position, either of the load pawls 60 or 61 may engage the teeth 50 of the rack bar 42 depending upon the position of the rack bar 42. Due to the spacing between the teeth on the load pawl 60 and the teeth on the load pawl 61, described above, one or the other of the pawls 60 and 61 will first engage the teeth 50 of the rack bar 42 depending upon the position of the rack bar 42 as the load pawls 60 and 61 are permitted to approach the rack bar 42 by the actuator 54. In FIG. 6 it is assumed that the pawl 61 was the first to engage the teeth 50 whereas in FIGS. 7 it is assumed that the load pawl 60 was the first to engage the teeth 50. Therefore, it will be apparent that the increment between the engagement of the rack bar 42 by the load pawl 60 and the engagement of the rack bar 42 by the load pawl 61 is a fraction of the spacing between the teeth 50, and in the preferred embodiment of the invention, the increment is approximately one-half the spacing between the teeth 50. The provision of two load pawls 60 and 61 has the further advantage that the brakes will not fail in the event that one of the load pawls 60 and 61 fails to engage the rack teeth 50. However, if these features are not desired, one of the load pawls 60 and 61 may be omitted with the consequent disadvantages, but the slack adjusting device will still have the other advantages described above.

When one of the load pawls 60 and 61 engages the teeth 50 of the rack bar 42, the brake applying force is transmitted through the housing 40, the load pawl 60 or 61 and the rack bar 42. Thus, there is a rigid connection between the live lever 8 and the fulcrum lever 24 and the full brake applying force is transmitted through the slack adjusting device 16. However, due to the construction of the mechanism, the load pawl 60 or 61 in engagement with the rack teeth 50 tends to deflect the rack bar 42 transversely of the housing 40. It is for this reason that the bearings or bearing blocks 52 or 53 are disposed on the side of the rack bar 42 opposite from the teeth 50 and directly opposite the rack teeth engaging portions of the load pawls 60 and 61. Such bearings 52 and 53 provide the necessary support for the rack bar 42.

When the brakes are released the cycle of operations described above is repeated in reverse order so that the parts return to the positions illustrated in FIG. 4. In the event that the over-all length of the slack adjusting device 16 must increase, for example, because of the replacement of worn brake shoes by new brake shoes, the rack bar 42 will move to the left with respect to the housing 40 when the load pawls 60 and 61 are disengaged from the teeth 50 of the rack bar 42, the locking pawl 70 riding over the teeth 50 when the rack bar 42 moves to the left.

It will be apparent from the foregoing that the slack adjusting device of the invention is a double acting device and is substantially totally enclosed. Furthermore, due to the disposition of the pawls and the rack teeth, the housing may be of minimum size and the rack bar may be supported at critical points. Furthermore, with the use of at least two load pawls the adjustment increments may be less than the spacing between the rack teeth, and the teeth may be made of a size sufficient to withstand the large forces involved. In addition, the use of two load pawls provides added safety in that the brakes will be applied even though one of the pawls may fail to engage the rack teeth.

Having thus described my invention with particular reference to the preferred form thereof and having shown and described certain modifications, it will be obvious to those skilled in the art to which the invention pertains, after understanding my invention, that various changes and other modifications may be made therein without departing from the spirit and scope of my invention, as defined by the claims appended thereto.

What is claimed as new and desired to be secured by Letters Patent is:

1. A slack adjusting device comprising a support member; a rack bar having rack teeth thereon at one side thereof, said rack bar being movably mounted on said support member; spring means acting between said member and said bar for urging said bar in a predetermined direction; a locking pawl and a load pawl mounted on said member adjacent said teeth and engageable respectively with opposite sides of said teeth for respectively preventing movement of said bar in said direction and in an opposite direction; means engaging said pawls for moving said pawls into engagement with said teeth; an actuator movably mounted on said member and engageable with said pawls, said actuator, in a first position thereof, engaging and holding said load pawl out of engagement with said teeth and permitting said locking pawl to engage said teeth, and said actuator, in a second position thereof, engaging and holding said locking pawl out of engagement with said teeth and permitting said load pawl to engage said teeth, and means acting between said member and said actuator for urging said actuator in a predetermined direction.

2. A slack adjusting device comprising a housing; a rack bar having rack teeth thereon at one side thereof, said rack bar being movably mounted with said teeth in said housing; spring means in said housing and acting between said housing and said bar for urging said teeth away from said housing; a load pawl and a locking pawl mounted in said housing adjacent said teeth and engageable respectively with opposite sides of said teeth for respectively preventing movement of said bar in opposite directions; means engaging said pawls for moving said pawls into engagement with said teeth; an actuator movably mounted in said housing and engageable with said pawls, said actuator, in a first position thereof, engaging and holding said load pawl out of engagement with said teeth and permitting said locking pawl to engage said teeth, said actuator, in a second position thereof, engaging and holding said locking pawl out of engagement with said teeth and permitting said load pawl to engage said teeth, and said actuator, in a third position thereof, engaging and holding both said pawls out of engagement with said teeth; and means acting between said housing and said actuator for urging said actuator away from said housing.

3. A slack adjusting device comprising a housing having first and second ends; a rack bar having rack teeth thereon at one side thereof, said rack bar being movably mounted with said teeth in said housing and with an end thereof extending from said first end of said housing; spring means in said housing and acting between said housing and said bar for urging said teeth away from said first end of said housing; a load pawl and a locking pawl mounted in said housing adjacent said teeth and engageable respectively with opposite sides of said teeth for respectively preventing movement of said bar in opposite directions; means engaging said pawls for moving said pawls into engagement with said teeth; an actuator movably mounted in said housing and engageable with said pawls, said actuator, in a first position thereof, holding said load pawl out of engagement with said teeth and permitting said locking pawl to engage said teeth, said actuator, in a second position thereof, holding said locking pawl out of engagement with said teeth and permitting said load pawl to engage said teeth, and said actuator, in a third position thereof, holding both said pawls out of engagement with said teeth; and spring means acting between said housing and said actuator for urging said actuator away from said first end of said housing.

4. A slack adjusting device comprising a housing having first and second ends; a rack bar having rack teeth thereon at one side thereof, said bar being movably mounted in said housing with the side thereof opposite said teeth supported by said housing, and said bar being mounted with said teeth within said housing and with one end of said bar extending from said first end of said housing; spring means within said housing and acting between said housing and said bar for urging said teeth away from said first end of said housing; a pair of spaced load pawls and a locking pawl rotatably mounted on said housing adjacent said teeth, each of said pawls having rack teeth engaging portions, said locking pawl cooperating with said teeth to prevent said bar from moving in a first direction with respect to said housing and said load pawls cooperating with said teeth to prevent said bar from moving in a second direction with respect to said housing; means engaging said pawls for urging said teeth engaging portions toward said teeth; an actuator movably mounted in said housing, said actuator having pawl engaging portions for disengaging said teeth engaging portions of said pawls from said teeth, said actuator and said portions being disposed with respect to said pawls so that in a first position of said actuator said load pawls are out of engagement with said teeth and said locking pawl is in engagement with one of said teeth, in a second position of said actuator, one of said load pawls is in engagement with one of said teeth and said locking pawl is out of engagement with said teeth and in a further position of said actuator, all said pawls are out of engagement with said teeth, said actuator having an activating arm extending from said housing; and spring means within said housing and acting between said housing and said actuator for urging said actuator away from said first end of said housing.

5. A slack adjusting device comprising a housing having first and second ends; a rack bar having rack teeth thereon at one side thereof, said bar being movably mounted in said housing with the side thereof opposite said teeth supported by said housing, and said bar being mounted with said teeth within said housing with one end of said bar extending from said first end of said housing; spring means within said housing and acting between said housing and said bar for urging said teeth away from said first end of said housing; a pair of load pawls and a locking pawl rotatably mounted on said housing adjacent said teeth, each of said pawls having rack teeth engaging portions, the rack engaging portions of said load pawls being spaced apart, in corresponding positions of said load pawls, a fractional multiple of the spacing of said rack teeth and being engageable with the sides of said teeth facing said first end of said housing and the rack engaging portion of said locking pawl being engageable with the opposite sides of said teeth, whereby when said locking pawl is in engagement with a side of one of said teeth, said bar is prevented from moving in a first direction with respect to said housing and when one of said load pawls is in engagement with a side of one of said teeth, said bar is prevented from moving in a second direction with respect to said housing; spring means acting between each of said pawls and said housing for urging said teeth engaging portions toward said teeth; an actuator movably mounted in said housing, said actuator having pawl engaging portions for disengaging said teeth engaging portions of said pawls from said teeth, said actuator and said portions being disposed with respect to said pawls so that in a first position of said actuator said load pawls are out of engagement with said teeth and said locking pawl is in engagement with one of said teeth, in a second position of said actuator, one of said load pawls is in engagement with one of said teeth and said locking pawl is out of engagement with said teeth and in an intermediate position of said actuator, all said pawls are out of engagement with said teeth, said actuator having an activating arm extending from said housing; and spring means within said housing and acting between said housing and said actuator for urging said actuator toward said second end of said housing.

6. A slack adjusting device comprising a tubular housing having a portion projecting from one side thereof and having first and second ends; a rack bar having rack teeth thereon at one side thereof, said teeth being disposed adjacent one end of said bar and said bar being slidably mounted in said housing with the side thereof opposite said teeth slidably supported by said housing, said bar being slidable in a direction extending axially of said housing, said bar being mounted with said teeth within said housing and with said teeth facing said projecting portion of said housing and said bar being mounted with the opposite end thereof extending from said first end of said housing; spring means within said housing and acting between said housing and said bar for urging said teeth away from said first end of said housing; a pair of load pawls and a locking pawl rotatably mounted on said housing in said projecting portion thereof, each of said said pawls having rack teeth engaging portions, the rack engaging portions of said load pawls being spaced apart, in corresponding positions of said load pawls, a fractional multiple of the spacing of said rack teeth and being engageable with the sides of said teeth facing said opposite end of said bar and the rack engaging portion of said locking pawl being engageable with the opposite sides of said teeth, whereby when said locking pawl is in engagement with a side of one of said teeth, said bar is prevented from sliding in a first direction with respect to said housing and when one of said load pawls is in engagement with a side of one of said teeth, said bar is prevented from sliding in a second direction with respect to said housing; spring means acting between each of said pawls and said housing for urging said teeth engaging portions toward said teeth; an actuator slidably mounted in said housing and slidable axially within said housing, said actuator having pawl engaging portions for disengaging said teeth engaging portions of said pawls from said teeth, said actuator and said portions being disposed with respect to said pawls so that in a first position of said actuator, said load pawls are out of engagement with said teeth and said locking pawl is in engagement with one of said teeth, in a second position of said actuator, one of said load pawls is in engagement with one of said teeth and said locking pawl is out of engagement with said teeth and in an intermediate position of said actuator, all said pawls are out of engagement with said teeth, said housing also having an opening therethrough adjacent said second end thereof and said slide having an activating arm extending therethrough and from said housing; and spring means within said housing and acting between said housing and said actuator for urging said actuator toward said second end of said housing.

7. A slack adjusting device comprising a tubular housing having a portion projecting from one side thereof and having first and second stops therein, said first stop being located at a first end of said housing and said second stop being spaced from said first stop and located between said first stop and the opposite, second end of said housing; a rack bar having rack teeth thereon at one side thereof, said teeth being disposed adjacent one end of said bar, and said bar having a collar thereon intermediate the ends thereof and intermediate said teeth and the opposite end of said bar, said bar being slidably mounted in said housing with the side thereof opposite said teeth slidably supported by said housing, said bar being slidable in a direction extending axially of said housing, said bar being mounted with said teeth and said collar within said housing and with said teeth facing said projecting portion of said housing and said bar being mounted with said opposite end thereof extending from said first end of said housing; spring means within said housing and acting between said first stop and said collar for urging said collar away from said first stop; a pair of load pawls and a locking pawl rotatably mounted on said housing in said projecting portion thereof with said locking pawl intermediate said load pawls, each of said pawls having rack teeth engaging portions, the rack engaging portions of said load pawls being spaced apart, in corresponding positions of said load pawls, a fractional multiple of the spacing of said rack teeth and being engageable with the sides of said teeth facing said opposite end of said bar and the rack engaging portion of said locking pawl being engageable with the opposite sides of said teeth, whereby when said locking pawl is in engagement with a side of one of said teeth, said teeth are prevented from moving in the direction of said second end of said housing and when one of said load pawls is in engagement with a side of one of said teeth, said teeth are prevented from moving in the direction of said first end of said housing; spring means acting between each of said pawls and said housing for urging said teeth engaging portions toward said teeth; an actuator slidably mounted in said housing and slidable axially within said housing, said actuator having a portion engageable with said second stop and having pawl engaging portions for disengaging said teeth engaging portions of said pawls from said teeth, said actuator and said portions being disposed with respect to said pawls so that in a first position of said actuator said load pawls are out of engagemement with said teeth and said locking pawl is in engagement with one of said teeth, in a second position of said actuator, one of said load pawls is in engagement with one of said teeth and said locking pawl is out of engagement with said teeth and in an intermediate position of said actuator, all said pawls are out of engagement with said teeth, said housing also having an axially extending slot therethrough adjacent said second end thereof and said actuator having an activating arm extending therethrough and from said housing; and spring means within said housing and acting between said second stop and said actuator for urging said actuator toward said second end of said housing.

8. In brake rigging apparatus including first and second brake operating members, a power source connected to said first member for moving said first member and an activating lever pivotally connected to said first member, the combination of a slack adjusting device interconnecting said members, said device comprising a support member connected at one end to one of said first members; a rack bar having rack teeth thereon on one side thereof, said rack bar being movably mounted on said support member; means connecting said rack bar to said second member; spring means acting between said support member and said bar for urging said bar in a predetermined direction; a locking pawl and a load pawl mounted on said support member adjacent said teeth and engageable respectively with opposite sides of said teeth for respectively preventing movement of said bar in said direction and in an opposite direction; means engaging said pawls for moving said pawls into engagement with said teeth; an actuator movably mounted on said member and engageable with said pawls, said actuator having means engageable with said activating lever in a predetermined position thereof and said actuator in a first position thereof, holding said load pawl out of engagement with said teeth and permitting said locking pawl to engage said teeth and said actuator, in a second position thereof, holding said locking pawl out of engagement with said teeth and permitting said load pawl to engage said teeth; and means acting between said support member and said actuator for urging said actuator in a predetermined direction.

9. A slack adjusting device comprising a support member; a rack bar having rack teeth thereon at one side thereof, said rack bar being movably mounted on said support member; spring means acting between said member and said bar for urging said bar in a predetermined direction; oppositely acting locking pawl means and load pawl means mounted on said member adjacent said teeth and engageable with said teeth, said locking pawl means comprising a locking pawl having a first position in which movement of said bar in said direction is prevented and having a second position in which movement of said bar in said direction is permitted and said load pawl means also comprising a load pawl having a first position in which movement of said bar in an opposite direction is prevented and having a second position in which movement of said bar in said opposite direction is permitted; an actuator movably mounted on said member and engageable with said pawls, said actuator, in a first position thereof, engaging and holding said load pawl in said second position thereof and permitting said locking pawl to assume said first position thereof, and said actuator, in a second position thereof, engaging and holding said locking pawl in said second position thereof and permitting said load pawl to assume said first position thereof, and means acting between said member and said actuator for urging said actuator in a predetermined direction.

References Cited in the file of this patent

UNITED STATES PATENTS

| | | |
|---|---|---|
| 1,700,835 | Farmer | Feb. 5, 1929 |
| 2,886,145 | Vaught et al. | May 12, 1959 |